April 30, 1968     A. O. JOHNSON     3,380,442
FUEL EVAPORATING ECONOMIZER FOR INTERNAL COMBUSTION ENGINES
Filed Sept. 3, 1965     2 Sheets-Sheet 1
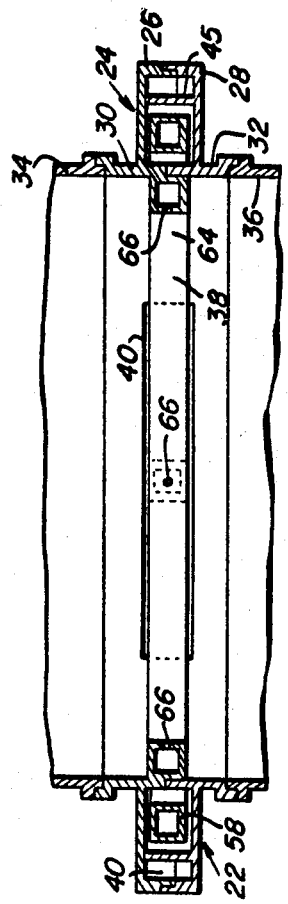
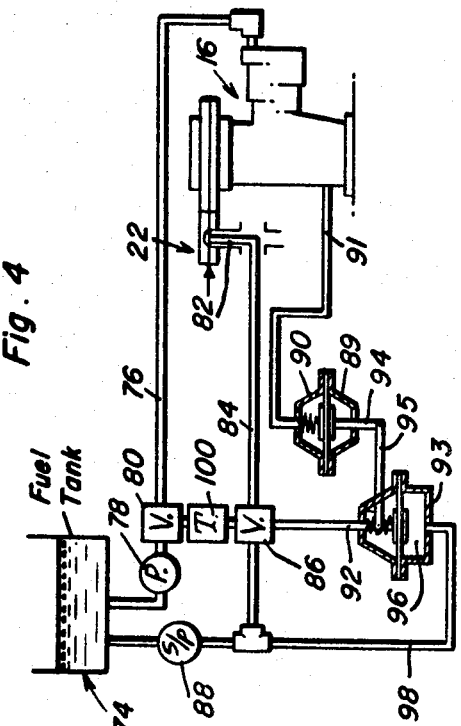
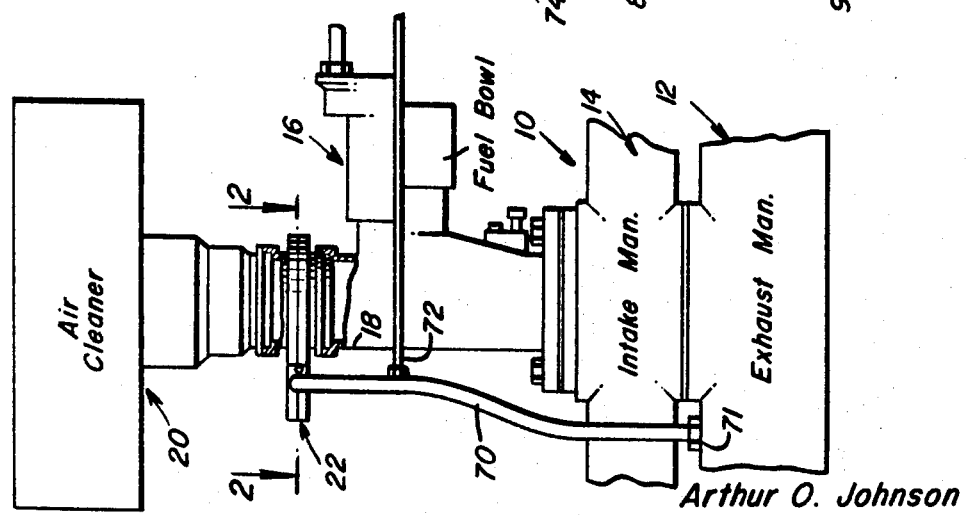
Arthur O. Johnson
INVENTOR.

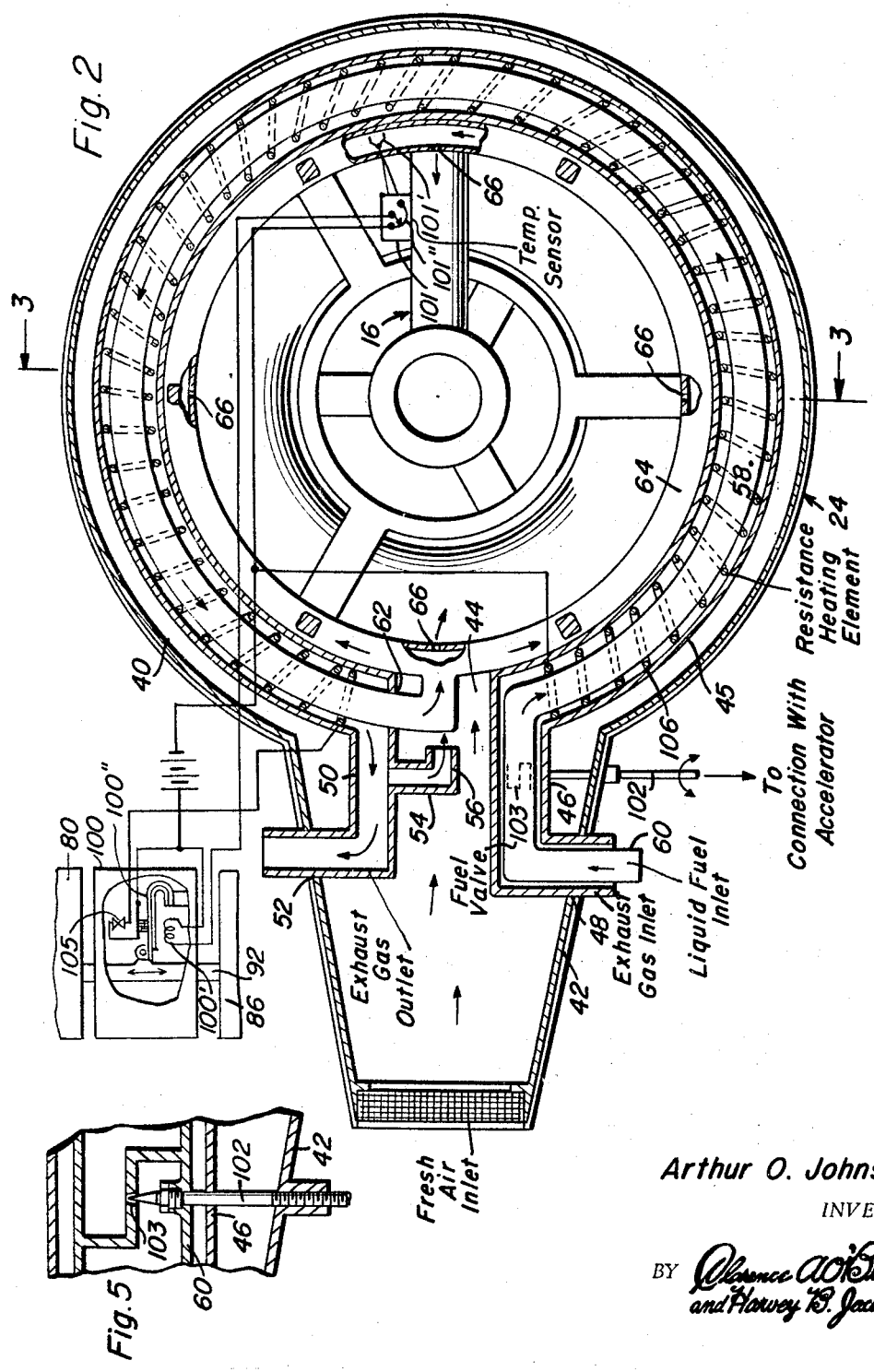

United States Patent Office 3,380,442
Patented Apr. 30, 1968

3,380,442
FUEL EVAPORATING ECONOMIZER FOR
INTERNAL COMBUSTION ENGINES
Arthur O. Johnson, Miami, Fla., assignor to Advance
Research and Engineering Corporation, Dade County,
Fla., a corporation of Florida
Filed Sept. 3, 1965, Ser. No. 484,857
13 Claims. (Cl. 123—127)

ABSTRACT OF THE DISCLOSURE

A fuel evaporating apparatus for use in conjunction with a conventional carburetor and including exhaust gas heated as well as electrical resistance heated fuel vaporizing chamber means operative to heat, vaporize and discharge fuel vapor into the engine intake passages with which the carburetor is operatively associated, the invention further including means for inversely varying the flow of liquid fuel to the conventional carburetor and to the fuel vaporizing chamber responsive to the effective temperature of the fuel vaporizing chamber whereby the associated combustion engine may be started by using the conventional carburetor and slowly converted from operation by fuel injected by the conventional carburetor to fuel vapors discharged by the fuel vaporizing means as the fuel vaporizing chamber is gradually heated to full operating temperature subsequent to operation of the associated combustion engine being initiated.

---

This invention relates to a novel and useful fuel evaporating economizer for internal combustion engines and more specifically to an economizer adapted to be utilized in conjunction with a conventional fuel and air induction system of a combustion engine.

The fuel evaporating economizer of the instant invention is adapted to heat and thereby vaporize liquid fuel such as gasoline and to be interposed between a pair of end aligned tubular air induction passage defining members with which a conventional carburetor is also associated. The economizer is adapted to initially utilize heat from a self-contained electrically actuated heating element and thereafter heat from the exhaust of the associated internal combustion engine to heat the liquid fuel delivered thereto and to thereby vaporize the fuel and thereafter inject the vaporized fuel into the air and fuel induction passages of the internal combustion engine.

Inasmuch as the economizer is capable of heating and vaporizing liquid fuel by means of the electrical heating element thereof even before the associated internal combustion engine has been operating a sufficient length of time to enable the exhaust gases of the internal combustion engine to provide the necessary exhaust heating effect on the liquid fuel therefor, the economizer is adapted to friction as a replacement for or as an alternate for the fuel metering portions of a carburetor of the associated internal combustion engine. Accordingly, suitable means is provided and interconnected between the fuel delivery systems for the carburetor and the economizer whereby the delivery of liquid fuel to the carburetor in the conventional manner may be terminated and the delivery of fuel to the fuel economizer may be initiated at will when it is desired to have the economizer perform the fuel metering functions.

It is the main object of this invention to provide a fuel evaporator for an internal combustion engine and operatively associated with the latter for providing a mixture of air and substantially completely evaporated fuel for the air and fuel induction system of the internal combustion engine.

Another object of this invention, in accordance with the immediately preceding object, is to provide a fuel evaporator including means designed to evaporate liquid fuel such as gasoline by heating the latter within certain portions of the economizer, the economizer being operatively connected to the exhaust system of the associated internal combustion engine for heating thereby.

Still another object of this invention is to provide an operative interconnection between the conventional carburetor of an internal combustion engine and the fuel evaporator of the instant invention whereby fuel flow to the conventional carburetor in the conventional manner may be terminated and the fuel flow to the evaporator of the instant invention may be initiated.

Yet another object of this invention is to provide a fuel vaporizer which will, in addition to performing the function of discharging vaporized liquid fuel into the air and fuel induction passages of the associated internal combustion engine, also discharge a small quantity of the exhaust gases of the associated internal combustion engine into the air and fuel induction passages whereby the temperature of the gases passing through these passages will be increased.

Still another object of this invention is to provide a fuel vaporizer in accordance with the second-mentioned object including electrical resistance heating means also operative to provide the necessary heat to vaporize the fuel handled by the economizer for initially starting the internal combustion engine and until sufficient engine exhaust heat is realized to vaporize the fuel.

A final object of this invention to be specifically enumerated herein is to provide a fuel evaporator in accordance with the preceding objects which will conform to conventional forms of manufacture, be of simple construction and easy to install so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a portion of the air and fuel induction system of a combustion engine shown with the fuel evaporator economizer of the instant invention interposed between the air cleaner and the carburetor of the conventional air and fuel induction system of the combustion engine;

FIGURE 2 is an enlarged horizontal sectional view taken substantially upon the plane indicated by the section line 2—2 of FIG. 1;

FIGURE 3 is a fragmentary vertical sectional view taken substantially upon the plane indicated by the section line 3—3 of FIG. 2;

FIGURE 4 is a diagrammatical view of the conventional carburetor and the fuel economizer of the instant invention together with the conventional and supplemental fuel delivery systems for the carburetor and fuel economizer, respectively; and FIGURE 5 is a fragmentary enlarged horizontal sectional view of the portion of the economizer provided with control valve means for metering the fuel to be heated in and as a result vaporized by the economizer.

Referring now more specifically to the drawings, the numeral 10 generally designates a fragmentary portion of a conventional internal combustion engine including an exhaust manifold generally referred to by the reference numeral 12, an intake manifold generally referred to by the reference numeral 14 and a carburetor generally referred to by the reference numeral 16 mounted on the inlet flange of the intake manifold.

Mounted atop the air horn 18 of the carburetor 16 is an air cleaner generally referred to by the reference numeral 20 and the fuel evaporating economizer of the instant invention is generally designated by the reference numeral 22 and is interposed between the air cleaner and the air horn 18.

With attention now directed more specifically to FIGS. 2 and 3 of the drawings it may be seen that the fuel evaporating economizer 22 comprises a housing generally referred to by the reference numeral 24 including upper and lower halves 26 and 28 which are interconnected in any convenient manner. The upper half of the housing 24 includes an inlet neck 30 and the lower half of the housing includes an outlet neck 32. The inlet neck 30 is communicated with the outlet of the air cleaner 20 by means of a connecting tubular conduit 34 and the outlet neck 32 is communicated with the air horn 18 by means of a connecting tubular conduit 36.

The housing 24 defines a generally cylindrical passage 38 extending therethrough of which the inlet and outlet necks 30 and 32 comprise the inlet and outlet ends, respectively, and the housing further includes means defining an inlet air chamber 40 extending circumferentially thereabout and opening generally radially outwardly thereof by means of an inlet neck 42 and generally radially inwardly thereof by means of an outlet opening 44. Further, the housing 24 also defines an exhaust gas conduit 45 disposed in the inlet air chamber 40 and extending circumferentially about the housing 24. The exhaust gas conduit includes an inlet end portion 46 disposed in the inlet neck 42 and opening outwardly of the latter as at 48 and an outlet end portion 50 also disposed within the inlet neck 42 and opening outwardly of the latter as at 52. Further, the outlet end portion includes a bleed outlet neck 54 projecting laterally of the outlet end portion 50, disposed within the inlet neck 42 and opening outwardly of the exhaust gas conduit 45 within the inlet neck 42 as at 56 and in a direction opening toward the outlet end of the outlet 44.

The housing 24 also includes a liquid fuel vaporizing chamber or conduit 58 including an inlet end 60 and which extends through the inlet end portion 46 and throughout a major portion of the circumference of the exhaust gas conduit 45. The liquid fuel conduit 58 extends through the wall of the outlet end portion 50 of the exhaust gas conduit 45 as at 62 and within the inlet neck 42 and passes through the outlet opening 44 of the inlet neck 42 and terminates in a tubular fuel dispensing ring 64. The fuel dispensing ring 64 includes a plurality of generally radially inwardly opening vaporized fuel outlet openings 66 through which vaporized fuel is adapted to pass into the flow of air passing from the air cleaner 20 to the carburetor 16.

The inlet end portion 46 of the exhaust gas conduit 45 is connected to the exhaust gas conduit 70 whose inlet end is in direct communication with the interior of the exhaust manifold 12 as at 71. The conduit 70 may have the inlet end of a choke heater conduit 72 communicated therewith whereby an exhaust gas heated choke actuator of the carburetor 16 may receive exhaust heat from the internal combustion engine 10 in the conventional manner.

With attention now directed more specifically to FIG. 4, the reference numeral 74 generally designates a liquid fuel supply tank for the internal combustion engine 10 including a main fuel line 76 for supplying fuel to the carburetor 16 in the conventional manner by means of a fuel pump 78 driven from the engine 10 or in any other conventional manner such as by an electric motor. A control valve 80 is disposed within the fuel line 76 and it may be seen that the inlet end 60 of the liquid fuel conduit 58 is in communication with the outlet end 82 of a secondary liquid fuel line 84 also having a control valve 86 disposed therein. A special fuel pump 88 driven by any conventional manner is provided for pumping liquid fuel through the fuel line 84.

A fluid motor generally referred to by the reference numeral 89 is provided and includes a vacuum chamber 90 communicated with the interior of the carburetor 16 by means of a vacuum line 91 and the actuator rod 92 of a second fluid motor 93 is connected with the actuator rod 94 of the motor 90 by means of a pivoted lever 95. Therefore, the rod 92 is actuated in response to a change in fluid pressures within the line 91 and the liquid fuel chamber 96 of the fluid motor 93 which is communicated with the line 84 by a line 98.

The rod 92 is operatively connected to the control valves 80 and 86 as well as a thermostat generally referred to by the reference numeral 100 as illustrated in FIGURE 2 so that in response to engine vacuum and fuel pressure effected by the special pump 88 as well as temperature of the fuel in the fuel dispensing ring 64 the control valves 80 and 86 will be inversely operated.

The temperature sensing and rheostat assembly 101 of the thermostat 100 includes a temperature sensing element 101' disposed in good heat transfer relation with the interior of the ring 64 and operatively connected to a rheostat 101" which is in turn electrically connected to a source of electrical potential and a heating element 100' disposed in good heat transfer relation with the bimetallic member 100" of the thermostat 100. The bimetallic member 100" is connected to the rod 92, see FIG. 2, and the inlet end 60 of the liquid fuel manifold 58 is provided with an adjustable throttle valve element 102 cooperating with a seat 103 and operatively connected to the throttle controls (not shown) of the carburetor 16 in any convenient manner. Further, the exhaust gas conduit 45 has an electrical resistance heating element 106 electrically connected to the source of electrical potential through the relatively movable contacts 105 of the thermostat 100 disposed therein in good heat transfer relation with the manifold 58 and operable to provide the necessary heat to vaporize the fuel passing through the manifold 58 in the absence of sufficient exhaust gas heat. Of course, the thermostat 100 is operatively connected to the element 106 to effect its operation whenever sufficient exhaust heat is not available.

In operation, the fuel evaporating economizer does not comprise an appreciable restriction to the flow of air from the air cleaner 20 to the carburetor 16 and therefore operation of the internal combustion engine 10 when the latter is initially started may be substantially conventional. Thereafter, fuel pressure within the line 98 will build up within the fuel motor 93 and be operative to begin closing the valve 80 and opening the valve 86. However, the opening and closing of the valves 80 and 86 is also controlled by the thermostat 100 and the latter will not allow complete opening and closing of the valves 80 and 86, respectively, until such time as the manifold 58 has been suitably warmed by the exhaust gases passing from the manifold 12 and into the exhaust gas conduit 44. The element 101' is disposed within the ring 64 so as to be responsive only to vaporization of the fuel within the ring 64.

After the manifold 58 has been partially heated by the exhaust gases the sensing element 101' will cause the rheostat 101" to reduce the current supplied to the heating element 100' and the bimetallic member 100" will then begin to bend so as to move the rod 92 upwardly whereby the valve 80 will slowly move toward a closed position and the valve 86 will slowly move toward an open position. This will cause liquid fuel to enter the conduit 58 and be heated by the exhaust gases within the housing 24 to the point of evaporating. The vaporized liquid fuel will then pass outwardly of the fuel ring 64 through the openings or ports 66 and commingle with the air passing from the air cleaner 20 to the carburetor 16.

In addition to exhaust gases entering the conduit 45 being operative to provide sufficient heat for vaporizing fuel within the manifold 58, the heating element 106 is also operative to provide the necessary heat. Accordingly, while the engine 10 may be initially started by using the carburetor 16 and operated thereby until such time as sufficient exhaust heat is provided to vaporize the fuel in the manifold 58, the heating element 106 may be operated for a short period of time prior to attempting to start the engine 10.

The outlet end portion 50 of the exhaust gas conduit 45 is disposed in communication with the ambient atmosphere and the outlet neck 54 will discharge a small portion of the exhaust gases passing through the exhaust gas conduit 45 into the inlet neck 42 for mixing with the fresh air passing through the inlet neck 42 from the ambient atmosphere and into the air and fuel inlet passages.

That portion of the exhaust gases which pass through the opening 44 tend to warm the air passing through the economizer 22 and further assist in completely vaporizing the fuel delivered to the intake manifold 10 by means of the economizer 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a combustion engine including air intake passage means, an exhaust manifold and a carburetor comprising a part of said air intake passage means, a fuel evaporating economizer comprising a tubular body also forming a part of said air intake passage means, said tubular body including means defining liquid fuel passage means extending circumferentially thereabout, exhaust gas passage means also extending circumferentially thereabout and disposed in good heat transfer relation with said liquid fuel passage means, said liquid fuel passage means including liquid fuel inlet means and circumferentially spaced and inwardly opening vaporized fuel outlet means, said exhaust gas passage means including exhaust inlet means and exhaust outlet means, means communicating said exhaust manifold with said exhaust inlet means, said carburetor including fuel inlet means having a control valve disposed therein, a control valve operatively associated with said fuel inlet means of said liquid fuel passage means of said tubular body, means operatively connecting said valves for inverse operation, said means connecting said valves for inverse operation including heat responsive means for opening the control valve of said liquid fuel passage means and closing the control valve of said carburetor fuel inlet means in response to a rise in temperature of the fuel in said liquid fuel passage defining means of said economizer above a predetermined temperature.

2. The combination of claim 1 wherein said means connecting said valves includes means responsive to an increase of manifold vacuum of said engine to at least partially open and partially close said control valves of said economizer liquid fuel inlet means and said carburetor fuel inlet means, respectively.

3. The combination of claim 2 including a fuel pump engine accessory interposed in said economizer liquid fuel inlet means, said means connecting said valves also including means responsive to operation of said fuel pump to at least partially open and partially close said control valves of said economizer liquid fuel inlet means and said carburetor fuel inlet means, respectively.

4. A fuel evaporating economizer for combustion engines, said economizer comprising a tubular body adapted to be interposed between a pair of end aligned tubular air passage defining members, said tubular body including means defining liquid fuel passage means extending circumferentially thereabout, and exhaust gas passage means also extending circumferentially thereabout and disposed in good heat transfer relation with said liquid fuel passage means, said liquid fuel passage means including fuel inlet means and circumferentially spaced and inwardly opening vaporized fuel outlet means, said exhaust gas passage means including exhaust inlet means and exhaust outlet means, electrical resistance heating means also disposed in good heat transfer relation with said liquid passage means and operable to provide sufficient heat adjacent said liquid fuel passage means for vaporizing liquid fuel disposed therein until sufficient engine exhaust gas heat is realized, thermostat means operatively connected to said electrical resistance heating means and operative in response to sufficient heat within said liquid fuel passage means caused by exhaust gases passing through said exhaust gas passage means to terminate operation of said electrical resistance heating means.

5. In combination with a combustion engine including air intake passage means, an exhaust manifold and a carburetor comprising a part of said air intake passage means, a fuel evaporating economizer comprising a tubular body also forming a part of said air intake passage means, said tubular body including means defining liquid fuel passage means extending circumferentially thereabout, exhaust gas passage means also extending circumferentially thereabout and disposed in good heat transfer relation with said liquid fuel passage means, said liquid fuel passage means including liquid fuel inlet means and circumferentially spaced and inwardly opening vaporized fuel outlet means, said exhaust gas passage means including exhaust inlet means and exhaust outlet means, and means communicating said exhaust manifold with said exhaust inlet means, electrical resistance heating means also being disposed in good heat transfer relation with said liquid passage means and operable to provide sufficient heat adjacent said liquid fuel passage means for vaporizing liquid fuel disposed therein until sufficient engine exhaust gas heat is realized, said carburetor including fuel inlet means having a control valve disposed therein, a control valve operatively associated with said fuel inlet means of said liquid fuel passage means of said tubular body, means operatively connecting said valves for inverse operation, said means operatively connecting said valves for inverse operation including thermostat means responsive to sufficient heat within said liquid fuel passage means to vaporize liquid fuel therein to close the control valve of said carburetor fuel inlet means and open the control valve of said fuel inlet means of said liquid fuel passage means.

6. The combination of claim 5 wherein said thermostat means is also operatively connected to said electrical resistance heating element and operative to terminate operation of said electrical resistance heating element in response to an increase of temperature in said liquid fuel passage means sufficiently high to cause fuel within said liquid fuel passage means to vaporize.

7. In combination with a combustion engine of the type including air intake passage means, exhaust gas passage means and liquid fuel and air mixing means comprising a part of said intake passage means being operable to cause liquid fuel to be discharged into a stream of air passing through said air intake passage means, fuel vaporizing means including a fuel vaporizing chamber, means operative to discharge vaporized fuel from said chamber into said air intake passage means, heating means operatively associated with said chamber for heating and thus vaporizing liquid fuel therein, a source of liquid fuel, fuel conveying means operative to convey fuel from said source to said fuel and air mixing means and also to said fuel vaporizing chamber, said conveying means including valve means operative to inversely control the amount of fuel conveyed to said fuel and air mixing means and said fuel vaporizing means, and control means for said valve means operative to increase the flow of fuel to said fuel vaporizing chamber and decrease the flow of fuel to said fuel and air mixing means in response to a rise in the effective temperature of said fuel vaporizing means.

8. The combination of claim 7 wherein said fuel vaporizing means also includes means operative to admit limited quantities of the ambient atmosphere into said air intake passage means adjacent the zone of discharge of fuel vapors from said fuel vaporizing chamber into said air intake passage means.

9. The combination of claim 8 wherein said fuel vaporizing means includes means operative to convey a small portion of the exhaust gases from said exhaust gas passage means for discharge into said zone.

10. The combination of claim 7 wherein said heating means includes means operative to convey a portion of the exhaust gases from said exhaust gas passage means into good heat transfer relation with said chamber.

11. The combination of claim 7 wherein said heating means includes electrical resistance heating means disposed in good heat transfer relation with said chamber.

12. The combination of claim 7 wherein said heating means includes electrical resistance heating means disposed in good heat transfer relation with said chamber, and means operative to convey a portion of the exhaust gases from said exhaust gas passage means into good heat transfer relation with said chamber.

13. The combination of claim 12 wherein said electrical resistance heating means includes an electrical circuit adapted to be connected to a suitable source of electrical potential for electrically actuating said desistance heating means, said circuit including temperature responsive switch means operative to sense sufficient heating of said fuel vaporizing chamber by said portion of exhaust gases to render continued operation of said resistance heating means unnecessary and to open said circuit when said sufficient heating is sensed.

References Cited
UNITED STATES PATENTS

| | | |
|---|---|---|
| 1,067,582 | 7/1913 | Boyd et al. |
| 1,136,845 | 4/1915 | Tate. |
| 1,326,000 | 12/1919 | Schmid _____ 123—122 |
| 1,611,299 | 12/1926 | Wilka. |
| 1,983,957 | 12/1934 | White _____ 123—127 X |
| 2,030,508 | 2/1936 | Falconer _____ 123—122 X |
| 2,129,930 | 9/1938 | Hans _____ 123—127 |
| 2,889,904 | 6/1959 | Martinoli _____ 123—119 X |
| 3,184,295 | 5/1965 | Baverstock _____ 123—135 X |

JULIUS E. WEST, *Primary Examiner.*